United States Patent [19]

Zimmer

[11] 4,297,908
[45] Nov. 3, 1981

[54] LEVERAGE SYSTEM
[75] Inventor: Ernst Zimmer, Friedberg, Fed. Rep. of Germany
[73] Assignee: Industrie-Werke Karlsruhe Augsburg Aktiengesellschaft, Augsburg, Fed. Rep. of Germany
[21] Appl. No.: 76,920
[22] Filed: Sep. 19, 1979
[30] Foreign Application Priority Data
Sep. 22, 1978 [DE] Fed. Rep. of Germany ....... 2841183
[51] Int. Cl.$^3$ .......................... G05G 1/04; F16H 21/44
[52] U.S. Cl. ........................................ 74/469; 74/103; 74/105; 74/106; 74/520; 92/118
[58] Field of Search .................. 74/103, 105, 106, 469, 74/520; 92/118
[56] References Cited
U.S. PATENT DOCUMENTS

| 1,282,853 | 10/1918 | Kelle ........................................ 74/103 |
| 2,767,262 | 10/1956 | Heintz ................................. 74/106 X |
| 3,181,408 | 5/1965 | Richards, Sr. ..................... 74/520 X |
| 3,263,516 | 8/1966 | Chisholm ............................ 74/105 |

FOREIGN PATENT DOCUMENTS

| 2701151 | 7/1978 | Fed. Rep. of Germany. |
| 1397240 | 3/1965 | France. |
| 2348020 | 10/1977 | France. |
| 253424 | 6/1926 | United Kingdom. |
| 291590 | 6/1928 | United Kingdom. |
| 322574 | 12/1929 | United Kingdom. |
| 327478 | 4/1930 | United Kingdom. |
| 402344 | 11/1933 | United Kingdom. |
| 604852 | 7/1948 | United Kingdom. |
| 685351 | 12/1952 | United Kingdom. |
| 1070250 | 6/1967 | United Kingdom. |
| 1110475 | 4/1968 | United Kingdom. |
| 1169060 | 10/1969 | United Kingdom. |
| 1525999 | 9/1978 | United Kingdom. |
| 1534562 | 12/1978 | United Kingdom. |

Primary Examiner—Allan D. Herrmann
Attorney, Agent, or Firm—Karl F. Ross

[57] ABSTRACT

In a leverage system, a four-member articulated linkage pivoted at one extremity on a support, one linkage member being rigid with a load arm carrying a gripper assembly for holding a tool, is connected via a pair of force-transferring levers to a pneumatic cylinder for counterbalancing gravitational moments. One lever is articulated at one end to a pivot of the four-member linkage and at another end in a toggle link to the piston of the cylinder, while the other lever is pivotally connected at one end to the piston and the toggle lever and at an opposite end to an arm of a bell crank forming a linkage member.

5 Claims, 5 Drawing Figures

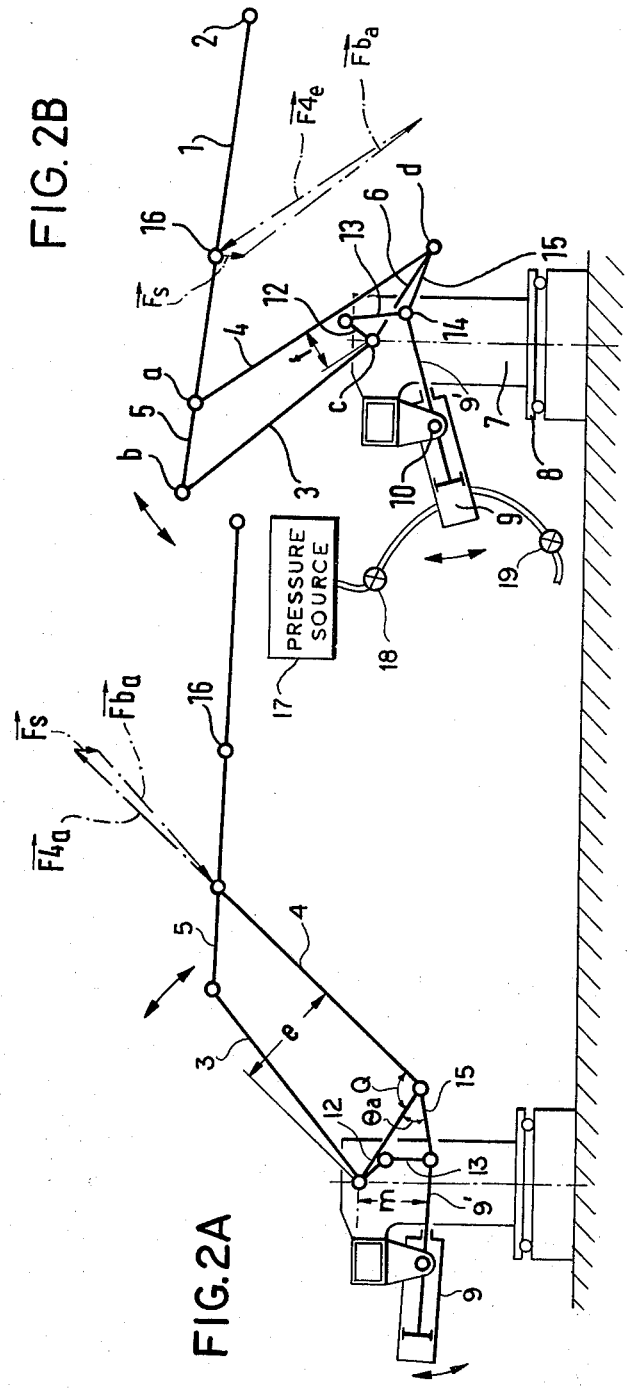

LEVERAGE SYSTEM

FIELD OF THE INVENTION

My present invention relates to a leverage system. In particular, my invention relates to a weight-compensating assembly in such a system.

BACKGROUND OF THE INVENTION

Leverage systems are known which comprise a load arm connected at one end to a linkage network and at an opposite end to a gripper. The gripper holds any of a variety of tools for performing such diverse operations as loading and unloading, drilling, welding, lacquering, etc., while the linkage network is pivotally mounted on a vertically rotatable base for enabling the support of the gripper at nearly any location within a hemisphere. Such a leverage system has a weight-compensating assembly for counterbalancing the gravitational moment tending to swing the linkage network, the load arm and the gripper about the horizontal axis. Usually the weight compensator includes a pressure device for applying to the linkage network a force substantially proportional to the extension of the leverage system, the pressure device having a piston pivotally secured to a lever which is rigid with a so-called horizontal member of the linkage and which is swingable with this member about a pivot on the base (see German patent DE-OS 27 01 151).

OBJECTS OF THE INVENTION

An object of my present invention is to provide a leverage system of the above-mentioned type with an improved weight-compensating assembly.

A more particular object of my present invention is to provide such a leverage system in which the degree of variation in the force applied by the weight-compensating assembly is minimized.

SUMMARY OF THE INVENTION

A leverage system according to my present invention comprises a four-member articulated linkage pivotally secured to a support, a load arm rigid with one of the members of the linkage, a gripper on the load arm spaced from the linkage, and a weight-compensating assembly connected to the linkage for counterbalancing gravitational moments on the leverage system to maintain same stationary in a plurality of configurations. The weight-compensating assembly includes a force applicator, a first bar and a second bar, the force applicator being pivotally fixed to the support. The first bar is pivotally connected to the applicator and to a pivot of the linkage, while the second bar is hinged at one end to the applicator and to the first bar and at an opposite end to a member of the linkage. The bars coact in transmitting force from the applicator to the linkage and in pivoting the applicator to vary the direction of force application in accordance with the configuration of the linkage.

According to another feature of my present invention, the linkage includes a bell crank fulcrumed on the support and having an arm pivotally connected to the second bar to apply a tensile force thereto upon an extension of the leverage system, whereby the first bar is enabled to transmit increased compressive force to the linkage. The bell-crank arm applies a compressive force to the second bar upon a retraction of the leverage system, whereby force from the applicator is transferred to the linkage via both bars.

BRIEF DESCRIPTION OF THE DRAWING

These and other features of my present invention will now be described in detail, reference being made to the accompanying drawing in which:

FIG. 2A is a schematic diagram of a leverage system according to my present invention, shown in an extended position;

FIG. 2B is a diagram similar to FIG. 2A, showing the leverage system of my present invention in a retracted position;

SPECIFIC DESCRIPTION

Figure 1:
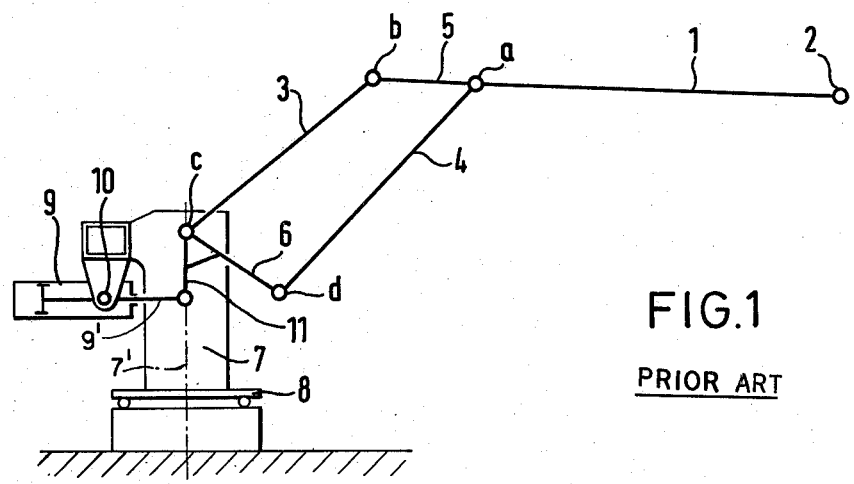
FIG. 1 is a schematic diagram of a conventional leverage system.

As shown in FIG. 1, a conventional leverage system for holding an object such as a tool successively positionable at a multiplicity of spaced locations comprises a load arm 1 with a gripper member 2 at one end for holding the tool, the load arm 1 being rigid at an opposite end with a short member or arm 5 of a four-member articulated linkage 3, 4, 5, 6. Members 3, 4, 5, 6 are connected to each other at four pivots a, b, c, d, pivot c being rigid with a support 7 which is mounted on a turntable 8 for rotation about a vertical axis 7'. A pneumatic cylinder 9 swingably attached to support 7 via a pivot 10 has a piston or plunger 9' which is hinged to a lever 11 rigid with linkage member 6 and pivotable therewith about articulation c. Cylinder 9 provides a weight-compensating moment for counterbalancing the gravitational force tending to rotate the leverage system about pivot c. It is clear that the greater the extension of the load arm 1 horizontally away from the support 7, the greater the gravitational moment about pivot c. Generally, with the system shown in FIG. 1, any increase in gravitational moment will be in greater part compensated by an increase in the force exerted by pneumatic cylinder 9.

The leverage system shown in FIGS. 2A and 2B has a weight-compensating assembly 9, 9', 10, 12–15, 17–19 whereby increases in gravitational moment about pivot c are compensated substantially by an increase in the moment arm m about pivot c of a force $\overline{F9}$ (see FIGS. 3A, 3B) supplied by pneumatic cylinder 9. Preferably, the weight-compensating assembly is designed to minimize variations in the magnitude of force $\overline{F9}$; ideally, the force supplied by cylinder 9 remains constant in magnitude, i.e. is independent of the configuration of linkage 3–6, a–d and the degree of extension of load arm 1.

In a leverage system according to my present invention, as illustrated in FIGS. 2A, 2B, cylinder piston 9' is connected via pivot 14 to bar or lever 13 in turn hinged to arm 12 of a bell crank 3, 12 whose other arm is constituted by linkage member 3, this bell crank having pivot c as a fulcrum. Piston 9' is also articulated by means of pivot 14 to bar or lever 15 in turn swingably secured to linkage members 4, 6 at pivot d.

Figures 3A, 3B:
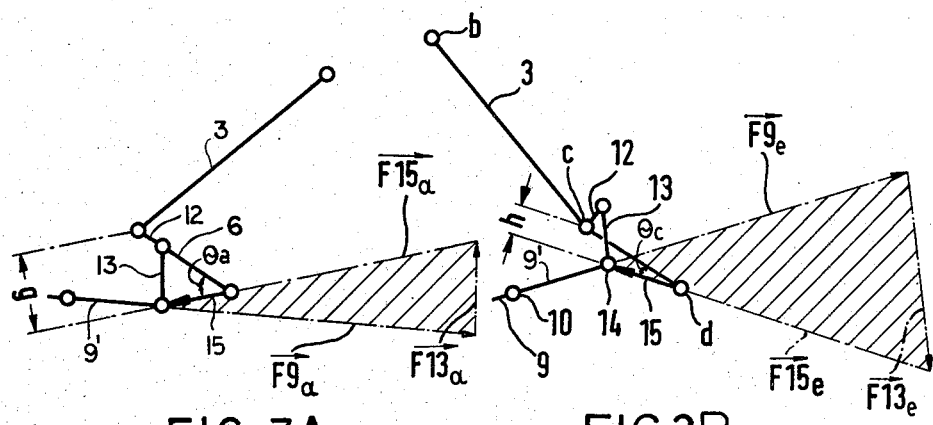
FIG. 3A is in part a force diagram showing forces acting on the leverage system shown in FIG. 2A.
FIG. 3B is in part a force diagram showing forces acting on the leverage system shown in FIG. 3B.

As shown in the force diagram of FIG. 3A, the forces impinging on pivot 14 in the extended disposition illustrated in FIG. 2A of a leverage system according to my present invention include compressive forces $\overline{F9_a}$, $\overline{F15_a}$ carried by piston 9' and lever 15, respectively, and a tensile force $\vec{F13_a}$ exerted by bell-crank lever 13. This tensile force $\vec{F13_a}$ is summed with the plunger force $\vec{F9_a}$ to produce resultant compressive force $\vec{F15_a}$ which is greater in magnitude than could be achieved in the absence of force $\vec{F13_a}$. An augmented compressive force $\vec{F15_a}$ is necessary to counteract the compressive force $\vec{F4_a}$ transmitted by member 4 (see FIG. 2A) upon extension of linkage 3–6 and load arm 1. It is to be noted that an angle $\theta_a$ subtended between lever 15 and member 6 upon extension of load arm 1 (FIG. 2A) is greater than an angle $\theta_e$ subtended between lever 15 and member 6 upon retraction of load arm 1 (FIG. 2B); thus, a greater portion of the piston force $\vec{F9_a}$ is transmitted to member 6 to counteract the gravitational moment about pivot c.

As illustrated in FIG. 3B, the forces $\vec{F9_e}$, $\vec{F13_e}$, $\vec{F15_e}$ experienced by pivot 14 upon retraction of a leverage system according to my present invention are all compressive. Forces $\vec{F13_e}$ and $\vec{F15_e}$ sum to balance piston force $\vec{F9_e}$. Clearly, there is a central toggle position of lever 15, wherein the same is aligned with piston 9' and consequently transfers the entire piston force $\vec{F9}$ to pivot d; if lever 15 is above this central position, then lever 13 will be in tension and will contribute to increasing the magnitude of force $\vec{F15}$; if lever 15 is below this position, lever 13 will be in compression and piston force $\vec{F9}$ will be distributed between levers 13, 15.

As shown in FIG. 2B, pneumatic cylinder 9 is connected to a pressure source 17, preferably a constant-pressure source, via a first valve 18 opening only upon the reduction of pressure inside cylinder 9 owing to an outward stroke of plunger 9'. A second valve 19 connects cylinder 9 to the atmosphere for releasing excess air upon a return stroke of plunger 9'.

The magnitude of the force $\vec{F4_a}$, $\vec{F4_e}$ transmitted by linkage member 4 in the extended (FIG. 2A) or the retracted (FIG. 2B) configuration of a leverage system according to my present invention may be calculated from the equation:

$$\vec{F_s} \times (\vec{r_5} + \vec{r_a, 16}) + \vec{F_4} \times \vec{r_5} = 0 \qquad (1)$$

where $\vec{F_4}$ is either $\vec{F4_a}$ or $\vec{F4_e}$; $\vec{F_s}$ is the combined weight of load arm 1, of gripper 2 and of a load held by the same, $\vec{F_s}$ acting through a center of gravity 16; $r_5$ is a vector extending along member 5 from pivot b to pivot a; and $\vec{r_a, 16}$ is a vector extending along load arm 1 from pivot a to center point 16. The direction of force $\vec{F4_a}$ or $\vec{F4_e}$ is known from the geometry. Upon the calculation of the magnitude of force $\vec{F4_a}$, $\vec{F4_e}$, the magnitude of force $\vec{F15_a}$, $\vec{F15_e}$ (see FIGS. 3A, 3B) may be determined through the equation:

$$F_{15} \sin \theta = F_4 \sin \phi \qquad (2)$$

where $F_{15}$ is the magnitude of force $\vec{F15_a}$ or $\vec{F15_e}$ and $F_4$ is the magnitude correspondingly of force $\vec{F4_a}$ or $\vec{F4_e}$; $\theta$ is either $\theta_a$ or $\theta_e$ and $\phi$ is the angle subtended by linkage members 4, 6. Equation (2) may be written:

$$F_{15} = F_4 \cdot (f/h) \qquad (3)$$

for the retracted configuration shown in FIG. 2B or:

$$F_{15} = F_4 \cdot (e/g) \qquad (4)$$

for the extended configuration shown in FIG. 2A, where parameters f and e are the distances of pivot c from member 4 in the retracted and the extended leverage-system configurations, respectively, while parameters h and g are the distances of pivot c from lever bar 15 in the same two positions, respectively (see FIGS. 3A and 3B). Forces $\vec{F13_a}$ and $\vec{F13_e}$ may then be determined with the aid of the force diagrams shown in FIGS. 3A and 3B.

I claim:

1. In a leverage system comprising: a support; a four-member articulated linkage pivotally secured to said support; a load arm rigid with one of the members of said linkage; a gripper on said load arm spaced from said linkage; and a weight-compensating assembly connected to said linkage for counterbalancing gravitational forces on said leverage system to maintain same stationary in a plurality of configurations, said linkage having a plurality of pivots;

the improvement wherein said weight-compensating assembly includes a force applicator pivotally fixed to said support, a first bar element pivotally secured to said applicator and to a pivot of said linkage, and a second bar element pivotally secured to one end to said applicator and said first bar element and at an opposite end to a member of said linkage, whereby said first and second bar elements coact in transmitting force from said applicator to said linkage and in pivoting said applicator to vary the direction of force application in accordance with the configuration of said linkage.

2. The improvement defined in claim 1 wherein said linkage includes a bell-crank member fulcrumed on said support and having an arm pivotally connected to said second bar element to apply tensile force thereto upon an extension of said leverage system, whereby said first bar element is enabled to transmit increased compressive force to said linkage, and to apply compressive force to said second bar element upon a retraction of said leverage system, whereby force from said applicator is transferred to said linkage via both bar elements.

3. In a manipulator having a load arm mounted on a four-pivot linkage system and a swingable weight-compensating system acting on said linkage system, said linkage system having two linkage levers pivotally connected to said arm at spaced-apart locations thereon, one of said levers being pivotally connected at a fixed location on a support, the other lever being pivotally connected to a member swingably mounted on said support at said fixed location, said weight compensating system acting upon said member, the improvement wherein said weight-compensating system includes a piston rod pivotally connected at a common pivot to two links, one of said links being pivotally connected to said other lever, the other of said links being pivotally connected to said member at a location spaced from said fixed location in a direction toward the pivot between said other lever and said member.

4. The improvement defined in claim 3 wherein said other of said links is pivotally connected to said member via a short projection therefrom.

5. The improvement defined in claim 3 wherein said piston rod is connected to a piston received in a fluid pressure cylinder, said cylinder being pivotally connected to said support.

* * * * *